Dec. 4, 1956     J. SAMARITANO     2,772,568
LIQUID FUEL GAUGE FOR AIRCRAFT
Filed June 7, 1954     2 Sheets-Sheet 1
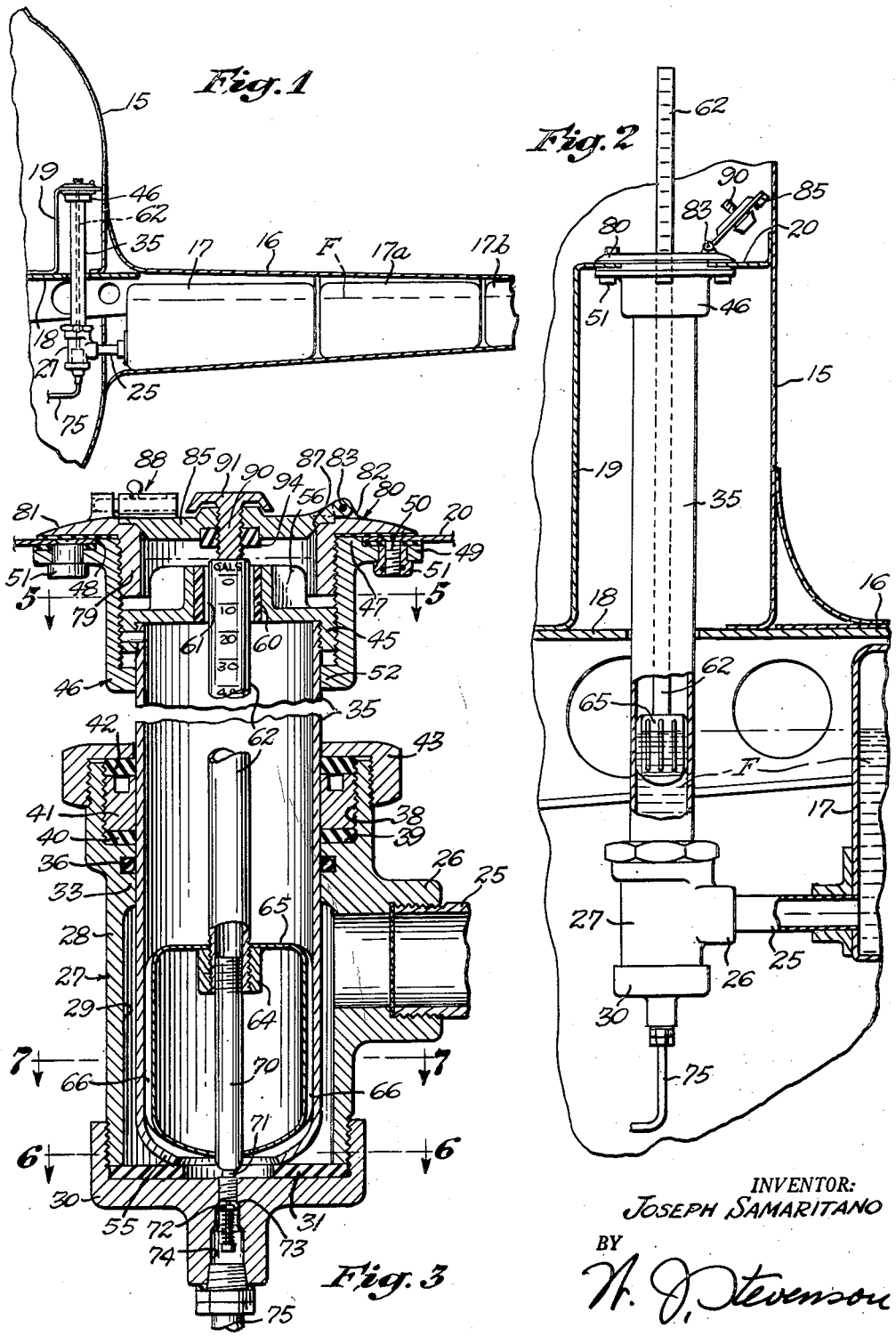
INVENTOR:
JOSEPH SAMARITANO
BY Dec. 4, 1956   J. SAMARITANO   2,772,568
LIQUID FUEL GAUGE FOR AIRCRAFT
Filed June 7, 1954   2 Sheets-Sheet 2
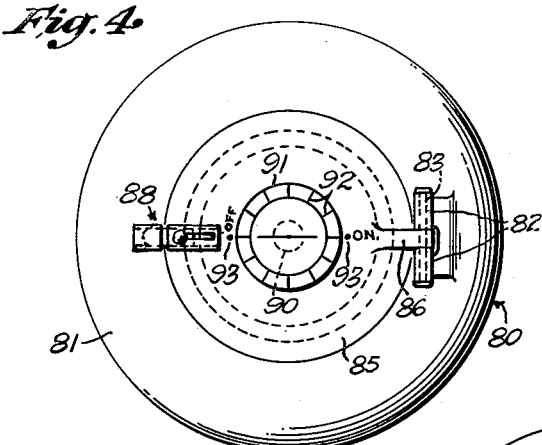
Fig. 4
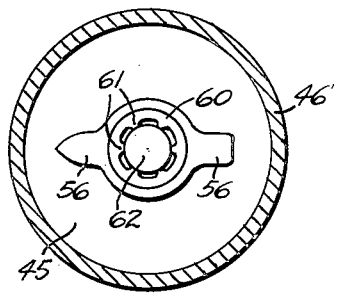
Fig. 5
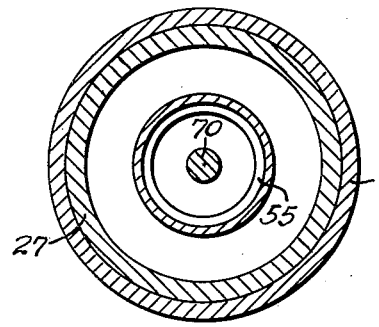
Fig. 6
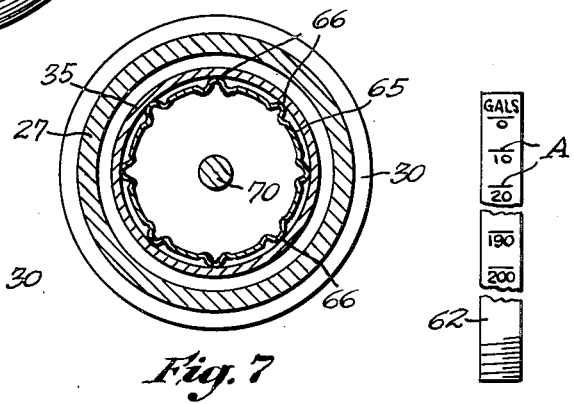
Fig. 7
Fig. 8
Fig. 9
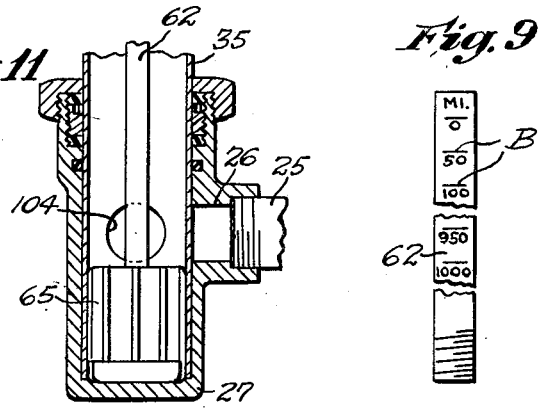
Fig. 11
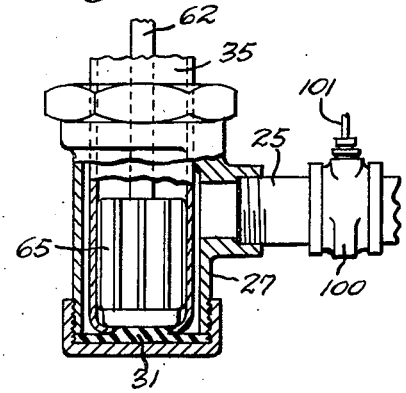
Fig. 10
INVENTOR:
JOSEPH SAMARITANO
BY
W. J. Stevenson

United States Patent Office 2,772,568
Patented Dec. 4, 1956

2,772,568

LIQUID FUEL GAUGE FOR AIRCRAFT

Joseph Samaritano, Hawthorne, Calif.

Application June 7, 1954, Serial No. 434,733

10 Claims. (Cl. 73—322)

This invention relates generally to liquid fuel gauges and more particularly to a float-actuated gauge for indicating the liquid content of a receptacle. Specifically, the invention pertains to a gauge device for indicating the liquid level in the fuel tanks of an aircraft.

The present invention is concerned with a float-operated gauge embodying several structural features disclosed in my pending patent application, Serial No. 278,421, filed March 25, 1952, for Liquid Fuel Gauge for Aircraft, of which the present application is a continuation-in-part.

One object of this invention is to provide a practical fuel gauge of a mechanical type, as distinguished from electronic gauges currently employed in some aircraft, the present gauge being of a telescopic type and readable by the pilot within the cockpit or cabin.

Another object of the invention is to provide a fuel gauge, of the general type referred to, which includes a vertical tube, the lower end of which communicates with the connected fuel tanks arranged within the aircraft wing to receive the fuel therein, a float slidable within the tube and restable upon the level of the liquid fuel therein, said float carrying an indicator rod or stick, the graduations of which register with a fixed part of the device to indicate the level of the fuel within the tanks and consequently the volume contained therein.

Another object of the invention is to provide a fuel gauge of the type indicated in which the float tube is connected to the inboard tank and extends upwardly into the cabin so that the float rod is visible to the pilot.

Another object is to provide a fuel gauge of the class specified in which the upper end of the float tube is equipped with a small hinged door which, when closed, seals the upper end of the tube and retains the float rod in its lower, inoperative position, said door being readily opened by the pilot to allow the float to rise within the tub and thus project its graduated rod upwardly above the door opening in position to be conveniently read by the pilot. A related object is to provide latching means for normally maintaining the door closed, said means being readily released to open the door.

Another object of the invention is to provide a fuel gauge device, of the character referred to, which has a housing providing a well or chamber into which the fuel flows from the tank, said housing having a sealing ring forming a seat against which the lower end of the float tube is engageable, the housing forming a bearing in which the tube is slidable and rotatable, the device further including screw means by which the tube may be drawn upwardly away from the seat to allow the fuel to enter the tube and forced downwardly against the seat to seal the tube against ingress of the liquid fuel. According to another feature and object of the invention, valve means is located in the bottom of the housing and coaxial with the float rod, said valve means being normally closed when the float is elevated to indicate the amount of fuel in the tanks but adapted to be opened by engagement of the rod after the tube has been engaged with the seat. By this provision, liquid fuel within the float tube may drain from the tube and flow into the tank by way of a return line, the float tube thus normally remaining dry as a safety factor.

Another object of the invention is to provide a fuel gauge device in which the float rod is marked with two sets of graduations, one indicating the volume of liquid fuel within the tanks and the other designating the approximate mileage which the airplane may be expected to travel, under normal flying conditions, with the existing amount of fuel.

A further object of the invention is to provide an aircraft fuel gauge which is relatively simple in construction and convenient to install in the airplane, one which may be easily disassembled when the need arises, one which is light in weight, and one which is positive in action and proof against getting out of order.

Further objects of my invention will appear from the following description and from the drawings which are intended for the purpose of illustration only, and in which:

Fig. 1 is a fragmentary section through the cabin or cockpit of an airplane and a portion of a wing thereof, showing the present fuel gauge installed therein;

Fig. 2 is a similar, enlarged view, shown partly in section;

Fig. 3 is a further enlarged vertical sectional view through the gauge device;

Fig. 4 is a top plan view of the gauge;

Figs. 5, 6 and 7 are cross-sectional views, taken respectively on lines 5—5, 6—6 and 7—7 of Fig. 3;

Figs. 8 and 9 are views of opposite sides of the float rod;

Fig. 10 is a part-sectional side view of a gauge of alternative construction; and Fig. 11 is a similar view of a further modified form of fuel gauge device.

Referring first to Figs. 1 to 9 of the drawings, the present fuel gauge is illustrated as installed in an airplane having a fuselage providing a cockpit or cabin 15, one side only of which is shown, a wing 16 extending laterally from the cabin and carrying a plurality of fuel tanks 17, 17a, 17b, etc., which are interconnected by means not shown so that the liquid fuel may flow to the inboard tank 17. The cabin 15 has a floor 18 and according to this invention an angular bracket or holder 19 is secured to the floor and side of the cabin, said bracket having an upper horizontal portion 20.

An outlet pipe 25 extends laterally from the tank 17 and screwed onto the outer screw-threaded end of this pipe is the branch 26 of a T fitting or housing 27. The housing 27 has a tubular vertical portion 28 provided with a recess or counterbore 29 in the inner surface of its wall. Screwed onto the lower threaded end of the housing 27 is a lower cap 30 and a resilient sealing ring or valving ring 31 is interposed and clamped between the housing and cap. The housing 27 has an intermediate bearing portion 33 in which a float tube 35 is rotatably and slidably arranged, an O-ring 36 being employed for sealing the housing against leakage of liquid fuel between the bearing portion and the tube.

The upper end of the housing 27 has a threaded counterbore 38 providing a shoulder 39 against which a sealing ring 40 seats. The ring 40 is compressed against the seat 39 so as to grip the tube 35, by means of a threaded sleeve 41 screwed into the counterbore 38. A similar sealing ring 42 is compressed against the upper end of the sleeve 41 by means of a nut element 43 screwed onto the upper threaded end of the housing. The sealing rings 36, 40 and 42 thus coact to prevent upward leakage of fuel from the housing.

At its upper end, the float tube 35 carries an externally threaded head 45 adapted to be screwed upwardly and downwardly within a mounting member 46. The member 46 has an upper central boss 47 disposed in an opening 48 in the portion 20 of the bracket 19 and a peripheral flange 49 which is fastened against the portion 20 by bolts 50 and nuts 51. The mounting member 46 has an inner annular flange 52 at its lower end for limiting the downward movement of the head 45 and tube 35.

The float tube 35 has an inturned annular, and somewhat conical, flange 55 at its lower end, this flange being engageable with the annular resilient seat 31. Thus, by rotating the head 45 in one direction, by means of ribs 56 thereon, the tube may be drawn upwardly to allow liquid fuel to enter the float tube 35 through its open end. On the other hand, rotation of the head 45 in the opposite direction forces the tube downwardly to firmly engage its flange 55 with the sealing ring 31 so as to shut off the flow of the fuel into the tube 35.

The head 45 is provided with an axial, plastic, bearing sleeve 60 having splines 61 therein (Fig. 5) which together form a bearing for the upper end of a vertically slidable float rod 62. Screwed onto the lower threaded end of the rod 62 is the hub portion 64 of a hollow float 65 which may be constructed from plastic material. As shown in Fig. 7, and disclosed in my pending application previously referred to, the float is provided with longitudinal ribs 66 forming point sliding contact with the inner surface of the float tube 35.

Coaxial with and projecting below the float 65 is a plunger 70, the lower end of which is engageable with the upper end of a valve stem 71 which is spring-actuated to normally engage its valve head 72 against a seat 73 located within a passage 74 formed in the cap 30. A fluid line 75 is screwed into the passage 74 and serves to return liquid fuel from the gauge to the fuel tanks in the manner and for the purpose to be hereinafter explained. The float tube 62 is adapted to be forced downwardly to open the valve 72 by means to be next described.

Screwed into the upper end of the mounting member 46 is the tubular hub portion 79 of a door ring member 80, the lower end of the portion 79 providing a stop to limit upward movement of the head 45. The member 80 has a peripheral flange 81 which seats against the portion 20 of the bracket 19. The member 80 has spaced ears 82 between which extends a hinge pin 83. A door or lid 85 has a hinge ear 86 pivoted on the pin 83, said door normally seating within a recess 87 in the ring member 80. A latching device, indicated at 88 is employed for releasably locking the door in closed position.

The door 85 carries an operating screw 90, the lower end of which is adapted to engage the upper end of the float rod 62 to depress the latter. The screw 90 is rotatable in the door 85 to adjust the height of its lower end, the screw having a head 91 provided with markings 92 registerable with index points 93 (Fig. 4) on the door. A sealing ring 94 surrounds the screw 90 to prevent leakage of fuel at this point.

Assuming that the fuel in the tank 17 is at the level shown in Fig. 2, the fuel F flows into and fills the chamber or well 29 of the fuel gauge. With the parts of the gauge assuming the positions shown in Fig. 3, the fuel is prevented from entering the float tube 35 by reason of the firm engagement of the flange 55 against the resilient seat or valving ring 31, and leakage of the fuel upwardly around the tube is avoided by the sealing rings 36, 40 and 42.

When the pilot wishes to ascertain the amount of fuel remaining in the tanks, he first releases the latch 88 and swings the door 85 open as shown in Fig. 2. He then unscrews the head 45 upwardly so as to displace the flange 55 from the seat 31. With the lower end of the tube 35 thus opened, the liquid fuel F enters the same and rises therein until it attains the level of the fuel in the tanks. Since the movement of the float rod 62 is now unrestricted, the float 65 rises in the tube 35 on the surface of the fuel as illustrated in Fig. 2, with the upper end of the gauge rod 62 projecting above the ring member 80. By observing the particular graduation A which registers with the upper surface of the member 80 (Fig. 8), the pilot can determine the number of gallons of fuel in the tanks. By reading the corresponding graduation B appearing at the opposite side of the rod 62 (Fig. 9), the estimated number of miles of normal flight which may be expected from the particular volume of fuel is readily determined by the pilot. It is to be understood that a fuel gauge of the type disclosed herein is installed at each side of the cabin or cockpit, each gauge indicating the amount of fuel in the tanks located in one wing of the airplane.

After taking the gauge readings, the pilot screws the head 45 downwardly until the lower flanged end 55 of the float tube 35 firmly engages the seat or sealing ring 31. The fuel F which previously entered the tube 35 thus is trapped therein. Now, to lower the float 65 and its rod 62, the pilot pushes the rod 62 downwardly and at the same time closes the door or lid 85 and latches it in closed position. At this time, the screw 90 engages the rod 62 to cause the lower end of the rod to contact the valve stem 71. By rotating the head 91 of the operating screw 90 in clockwise direction (Fig. 4), the rod 62 is caused to depress the valve stem 71 to open the valve 72 so as to allow the fuel to drain from the tube 35 around the float 65 and thence into the line 75 which returns it to the fuel tanks.

When re-fueling the airplane, the door 85 is opened, the tube 35 is raised and the valve 72 is closed so that as the fuel is introduced into the tanks, the liquid level rises within the tube 35 to elevate the float 65. When the fuel reaches a predetermined level, as indicated by the graduations on the rod 62, the pilot signals the attendant to discontinue the filling operation. The tube 35 is then lowered into sealing engagement with the seat 31, after which the door 85 is closed and the screw manipulated to open the valve 72.

Fig. 10 shows an alternative gauge structure in which the fuel remains within the tube 35, the float 65 being depressed in the fuel until the door 85 is opened, at which time the float bobs upwardly to the surface of the fuel in the tube. As in the embodiment of Figs. 1 to 9, the float tube 35 may be forced downwardly to engage a seat 31. In this modified gauge, a valve 100 is interposed in the pipe 25 and its movable valving element is operated from the pilot compartment by means of a cable 101.

In the embodiment illustrated in Fig. 11, the tube 35 is rotatable in the housing 27 and has an opening 104 which, when the tube is turned, is adapted to align with the inlet 25, 26 to admit fuel into the tube. When the tube 35 is rotated in the opposite direction the opening 104 is moved out of register with the inlet 25, 26 to shut off the ingress of fuel.

In accordance with the provisions of the patent statutes, I have herein disclosed the principle of my invention, together with the structures which I now consider to represent the best embodiments of the device. I wish to have it understood, however that other modifications might be made in the structure without departing from the spirit or scope of the invention, as defined in the appended claims.

I claim as my invention:

1. A gauge for indicating the level of liquid within a tank, comprising: a housing disposed at a side of the tank and having an inlet in fluid communication with the interior thereof; an elongate tube slidable vertically within the housing and projecting thereabove, there being an annular seal between the tube and housing at the upper portion of the latter, there being an annular space between the lower portion of the tube and the lower portion of the housing; valve means for selectively admitting fuel from said inlet into said tube and shutting off said flow, said valve means including a resilient sealing ring disposed within said housing, coaxially beneath the tube and below the level of said inlet, and an inturned annular flange at the lower end of said tube engageable with said sealing ring in response to downward movement of the tube so as to seal said annular space; a bearing at the upper end of said tube; a float slidable in said tube; a graduated rod carried by the float and slidable in said bearing; an annular member fixedly mounted above said tube and through which said rod is upwardly projectible; a door hinged to said annular member; and means on said door operable, when the door is closed down against said annular member, to engage the upper end of said rod and depress the rod so as to retain the float in a position adjacent the lower end of the tube.

2. A gauge for indicating the level of liquid within a tank, comprising: a housing disposed at a side of the tank and having an inlet in fluid communication with the interior thereof; an elongate tube carried by the housing and projecting thereabove; means for selectively admitting fuel from said inlet into said tube and shutting off said flow; annular sealing means engaging between the housing and tube for preventing leakage of fuel upwardly around the tube; a bearing at the upper end of said tube; a float slidable in said tube; a graduated rod carried by the float and slidable in said bearing; an annular member fixedly mounted above said tube and through which said rod is upwardly projectible; a door hinged to said annular member; means on said door operable, when the door is closed down against said annular member, to engage the upper end of said rod and depress the rod so as to retain the float in a position adjacent the lower end of the tube; a sealing ring within the lower portion of said housing beneath the lower end of said tube, said tube being slidable vertically within said housing and adapted when in a lower position to engage said sealing ring so as to prevent flow of the fuel into said tube by way of its lower open end, and adapted when in an upper position to disengage said sealing ring so as to allow flow of fuel into the tube; and manually operable means for sliding said tube.

3. A gauge for indicating the level of liquid within a tank, comprising: a housing disposed at a side of the tank and having an inlet in fluid communication with the interior thereof; an elongate tube carried by the housing and projecting thereabove; means for selectively admitting fuel from said inlet into said tube and shutting off said flow; annular sealing means engaging between the housing and tube for preventing leakage of fuel upwardly around the tube; a head at the upper end of said tube and provided with a bearing; a float slidable in said tube; a graduated rod carried by the float and slidable in said bearing; an annular member fixedly mounted above said tube and through which said rod is upwardly projectible; a door hinged to said annular member; means on said door operable, when the door is closed down against said annular member, to engage the upper end of said rod and depress the rod so as to retain the float in a position adjacent the lower end of the tube; a sealing ring within the lower portion of said housing beneath the lower end of said tube, said tube being slidable vertically within said housing and adapted when in a lower position to engage said sealing ring so as to prevent flow of the fuel into said tube by way of its lower open end, and adapted when in an upper position to disengage said sealing ring so as to allow flow of fuel into the tube; and manually-operable screw means for vertically sliding said tube, said screw means including interengaging screw threads on said annular member and said head.

4. A gauge for indicating the level of liquid within a tank, comprising: a housing disposed at a side of the tank and having an inlet in fluid communication with the interior thereof; an internally threaded mounting member fixedly mounted above said housing; a head screwed into said mounting member for vertical adjustment therein and having an axial bearing; a float tube carried by said head and having its lower end portion slidable vertically in said housing; annular sealing means engaging between the housing and tube for preventing leakage of fuel upwardly around the tube; an annular, resilient sealing ring disposed within the lower portion of said housing, said ring being engageable by the lower end of the float tube when the latter is slid downwardly so as to prevent flow of the liquid into the tube and being released by the tube end when the latter is slid upwardly so as to allow flow of the liquid into the tube; a graduated float rod slidable in said bearing and carrying a float at its lower end slidable in said tube, said rod being projectible above said mounting member; a door hinged relative to said mounting member; and means on said door operative, when the door is closed, to engage the upper end of said rod to force the rod and float downwardly in said tube.

5. A gauge for indicating the level of liquid within a tank, comprising: a housing disposed at a side of the tank and having an inlet in fluid communication with the interior thereof; an internally threaded mounting member fixedly mounted above said housing; a head screwed into said mounting member for vertical adjustment therein and having an axial bearing; a float tube carried by said head and having its lower end portion slidable vertically in said housing; annular sealing means engaging between the housing and tube for preventing leakage of fuel upwardly around the tube; an annular, resilient sealing ring disposed within the lower portion of said housing, said ring being engageable by the lower end of the float tube when the latter is slid downwardly so as to prevent flow of the liquid into the tube and being released by the tube end when the latter is slid upwardly so as to allow flow of the liquid into the tube; a graduated float rod slidable in said bearing and carrying a float at its lower end slidable in said tube, said rod being projectible above said mounting member; a ring member screwed into said mounting member; a door hinged to said ring member and adapted to be closed thereagainst to close the same; latching means for releasably locking the door in closed position; and a screw adjustably carried by said door and operative, when the door is in closed position, to engage the upper end of the rod to force the rod and float downwardly in said tube.

6. A gauge for indicating the level of liquid within a tank, comprising: a housing disposed at a side of the tank and having an inlet in fluid communication with the interior thereof and an outlet passage in its bottom end; an internally threaded mounting member fixedly mounted above said housing; a head screwed into said mounting member for vertical adjustment therein and having an axial bearing; a float tube carried by said head and having its lower end portion slidable vertically in said housing; annular sealing means engaging between the housing and tube for preventing leakage of fuel upwardly around the tube; an annular, resilient sealing ring disposed within the lower portion of said housing and surrounding said outlet passage, said ring being engageable by the lower end of the float tube when the latter is slid downwardly so as to prevent flow of the liquid into the tube and being released by the tube end when the latter is slid upwardly so as to allow flow of the liquid into the tube; a graduated float rod slidable in said bearing and carrying a float at its lower end slidable in said tube, said rod being projectible above said mounting member; a door hinged relative to said mounting member; means on said door operative, when the door is closed, to engage the upper end of said rod to force the rod and float downwardly in said tube; a valve in said outlet passage and arranged coaxial with said tube; and a plunger projecting axially downwardly from said float and engageable with said valve and adapted, when said tube and said float are in their lowermost positions, to open said valve so as to allow draining of the liquid from said tube through said outlet passage.

7. A gauge for indicating the level of liquid within a tank, comprising: a housing disposed at a side of the tank and having an inlet in fluid communication with the interior thereof and an outlet passage in its bottom end; an internally threaded mounting member fixedly mounted above said housing; a head screwed into said mounting member for vertical adjustment therein and having an axial bearing; a float tube carried by said head and having its lower end portion slidable vertically in said housing; annular sealing means engaging between the housing and tube for preventing leakage of fuel upwardly around the tube; an annular, resilient sealing ring disposed within the lower portion of said housing and surrounding said outlet passage, said ring being engageable by the lower end of the float tube when the latter is slid downwardly so as to prevent flow of the liquid into the tube and being released by the tube end when the latter is slid upwardly so as to allow flow of the liquid into the tube; a graduated float rod slidable in said bearing and carrying a float at its lower end slidable in said tube, said rod being projectible above said mounting member; a door hinged relative to said mounting member; means on said door operative, when the door is closed, to engage the upper end of said rod to force the rod and float downwardly in said tube; a valve slidable in said outlet passage and arranged coaxial with said tube; and a plunger projecting downwardly from said float and engageable with said valve and adapted, when said tube and said float are in their lowermost positions, to open said valve so as to allow draining of the liquid from said tube through said outlet passage.

8. A gauge for indicating the level of liquid within a tank, comprising: a housing disposed at a side of the tank and having an inlet in fluid communication with the interior thereof and an outlet passage in its bottom end; an internally threaded mounting member fixedly mounted above said housing; a head screwed into said mounting member for vertical adjustment therein and having an axial bearing; a float tube carried by said head and having its lower end portion slidable vertically in said housing; an annular, resilient sealing ring disposed within the lower portion of said housing, said ring being engageable by the lower end of the float tube when the latter is slid downwardly so as to prevent flow of the liquid into the tube and being released by the tube end when the latter is slid upwardly so as to allow flow of the liquid into the tube; a graduated float rod slidable in said bearing and carrying a float at its lower end slidable in said tube, said rod being projectible above said mounting member; a door hinged relative to said mounting member; means on said door operative, when the door is closed, to engage the upper end of said rod to force the rod and float downwardly in said tube; a spring-actuated valve slidable in said outlet passage; and a plunger projecting downwardly from said float and engageable with said valve and adapted, when said tube and said float are in their lowermost positions, to open said valve so as to allow draining of the liquid from said tube.

9. A gauge for indicating the level of liquid within a tank, comprising: a housing disposed at a side of the tank and having an inlet in fluid communication with the interior thereof; an internally threaded mounting member fixedly mounted above said housing; a head screwed into said mounting member for vertical adjustment therein and having an axial bearing; a float tube carried by said head and having its lower end portion slidable vertically in said housing; an annular, resilient sealing ring disposed within the lower portion of said housing, said ring being engageable by the lower end of the float tube when the latter is slid downwardly so as to prevent flow of the liquid into the tube and being released by the tube end when the latter is slid upwardly so as to allow flow of the liquid into the tube; a graduated float rod slidable in said bearing and carrying a float at its lower end slidable in said tube, said rod being projectible above said mounting member; a door hinged relative to said mounting member; means on said door operative, when the door is closed, to engage the upper end of said rod to force the rod and float downwardly in said tube; and sealing means within said housing engaging the outer surface of said float tube and preventing leakage of liquid upwardly between the outer surface of the tube and the internal surface of the housing.

10. A gauge for indicating the amount of liquid fuel in the wing tank of an airplane having a pilot's compartment provided with a floor, comprising: a housing disposed at a side of the tank and having a vertical bore and an annular recess, an inlet in a side communicating between the interior of the tank and said recess, said housing having upper and lower threaded ends; a cap screwed onto the lower end of the housing and having an axial outlet passage; an axially movable valve, spring-actuated to closed position; an annular sealing ring interposed between the cap and the lower end of the housing, a float tube slidable vertically in the housing; sealing elements within the upper end of the housing and compressed into sealing engagement between the housing and said tube by an upper cap screwed onto the upper end of the housing, said float tube extending upwardly through a hole in the floor of the pilot's compartment; a fixed bracket in the compartment; an annular mounting member carried by the bracket in axial alignment with the housing, said member having a threaded axial bore; a screw-threaded head secured to the upper end of said tube and screwed into said mounting member for vertical movement relative thereto, said head having an axial bearing; a door ring screwed into the upper end of the mounting member; a float slidable in said tube and having a depending plunger engageable with said valve; a graduated, tubular, float rod carried by the float and projecting upwardly through said bearing; a door hinged to said ring for closing the same; and a vertically adjustable screw carried by said door engageable with the upper end of said float rod, said float tube being slidable upwardly to disengage its lower end from said sealing ring so as to allow flow of the liquid fuel from said recess into said tube, said door being opened to allow the float to ascend upon the fuel within the tube so as to project the float rod above said door ring member, said float tube being operative, when moved downwardly, to engage its lower end against said sealing ring so as to shut off the flow of fuel into the tube, and said door being operative, through its screw, upon movement to closed position, to force the float rod and float downwardly so as to cause said plunger to engage said valve and thus effect draining of the fuel from said tube into said outlet passage.

References Cited in the file of this patent
UNITED STATES PATENTS

| | | |
|---|---|---|
| 1,602,063 | Williams | Oct. 5, 1926 |
| 1,709,875 | Pownall | Apr. 23, 1929 |
| 2,215,594 | Parsons | Sept. 24, 1940 |
| 2,282,691 | Ashley | May 12, 1942 |